United States Patent
Fukasawa (10) Patent No.: US 8,477,325 B2
(45) Date of Patent: Jul. 2, 2013

(54) APPARATUS AND METHOD OF MANAGING PRINT SETTINGS DATA, AND RECORDING MEDIUM

(75) Inventor: Naoki Fukasawa, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 640 days.

(21) Appl. No.: 12/707,806

(22) Filed: Feb. 18, 2010

(65) Prior Publication Data

US 2010/0225946 A1 Sep. 9, 2010

(30) Foreign Application Priority Data

Mar. 4, 2009 (JP) .................................. 2009-050391

(51) Int. Cl.
*G06F 3/12* (2006.01)

(52) U.S. Cl.
USPC ......................................... 358/1.13; 358/1.15

(58) Field of Classification Search
USPC ............................................... 358/1.13, 1.15
See application file for complete search history.

(56) References Cited

U.S. PATENT DOCUMENTS

2006/0279776 A1* 12/2006 Akiyama ...................... 358/1.15

FOREIGN PATENT DOCUMENTS

| JP | 2001-337801 A | 12/2001 |
| JP | 2001-350606   | 12/2001 |
| JP | 2007-200304 A | 8/2007  |
| JP | 2007-286700 A | 11/2007 |

OTHER PUBLICATIONS

Japanese Office Action issued Dec. 11, 2012 in Patent Application No. 2009-050391.

* cited by examiner

*Primary Examiner* — Twyler Haskins
*Assistant Examiner* — Justin Katzwhite
(74) *Attorney, Agent, or Firm* — Oblon, Spivak, McClelland, Maier & Neustadt, L.L.P.

(57) ABSTRACT

An apparatus and method of managing print settings data, and a recording medium storing a program for managing print settings data are provided. The print settings data is managed by printer driver, logical printer, group of users, or user, using a directory structure under a file system of an operating system.

11 Claims, 9 Drawing Sheets

| NAME | TYPE | DATA |
|---|---|---|
| ⋮ | ⋮ | ⋮ |
| PRINTER DATA DIRECTORY NAME | REG_SZ | d3k2 |
| ⋮ | ⋮ | ⋮ |

```
<?xml version= "1.0" encoding= "utf-8" ?>
<settings name= "HAND-OUT PRINT" >
    <item name= "DUPLEX PRINT" value= "NO" />
    <item name= "COMBINED PRINT" value= "2 in 1" />
    <item name= "PAPER SIZE" value= "A4" />
</settings>
```

FIG. 10

```
<?xml version= "1.0" encoding= "utf-8" ?>
<oneclick_files>
    <file name= "DEFAULT. xml" />
    <file name= "MEETING PRINT. xml" />
    <file name= "HAND-OUT PRINT. xml" />
</ oneclick_files>
```

```
<?xml version= "1.0" encoding= "utf-8" ?>
<groups>
    <group name= "GROUP 1" >
        <user name= "USER A" />
        <user name= "USER B" />
    </group>
    <group name= "GROUP 2" >
        <user name= "USER C" />
        <user name= "USER D" />
    </group>
</groups>
```

FIG. 17

APPARATUS AND METHOD OF MANAGING PRINT SETTINGS DATA, AND RECORDING MEDIUM

CROSS-REFERENCE TO RELATED APPLICATIONS

This patent application is based on and claims priority under 35 U.S.C. §119 to Japanese Patent Application No. 2009-050391, filed on Mar. 4, 2009, in the Japanese Patent Office, the disclosure of which is hereby incorporated herein by reference.

FIELD OF THE INVENTION

The present invention generally relates to an apparatus and method of managing print settings data, and a recording medium storing a program of managing print settings data.

BACKGROUND

An information processing apparatus such as a personal computer is usually installed with a printer driver to remotely control operation of a printer available for use by the information processing apparatus. In order to manage print settings data through the printer driver, various techniques have been introduced. For example, Japanese patent application publication No. 2001-350606 describes a printing system, which automatically generates print settings data for a printed document and stores the generated print settings data in association with a name of the printed document. When the document is to be printed again, the printing system automatically reads out the print settings data to cause the document to be printed according to the read print settings data.

While the above-described technique of generating and storing the print settings data by the printer driver improves the user operability, the print settings data once created remains undeleted even after the printer driver is uninstalled from the information processing apparatus. This is because the print settings data generated by the printer driver is not effectively managed by an operating system under a file system. This may cause the information processing apparatus to waste its limited memory space.

SUMMARY

Example embodiments of the present invention include an information processing apparatus provided on a printing system. The information processing apparatus includes a storage device and a data storage manager. The data storage manager creates a printer driver data directory for a printer driver installed onto the printing system on the storage device. The data storage manager creates a logical printer data directory for a logical printer being registered for the installed printer driver under the printer driver data directory so as to generate with the printer driver data directory a layered directory structure to be managed by an operating system of the printing system on the storage device. The data storage manager stores print settings data generated for the registered logical printer in the logical printer data directory generated on the storage device. The data storage manager stores information regarding a directory name of the logical printer data directory in a storage area of the storage device, the storage area being provided by the operating system for the logical printer.

In addition to the above-described example embodiments, the present invention may be practiced in various other ways, for example, as a computer program causing a computer to function as the above-described information processing apparatus or causing a computer to carryout the above-described method. The computer program may be stored in a recording medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
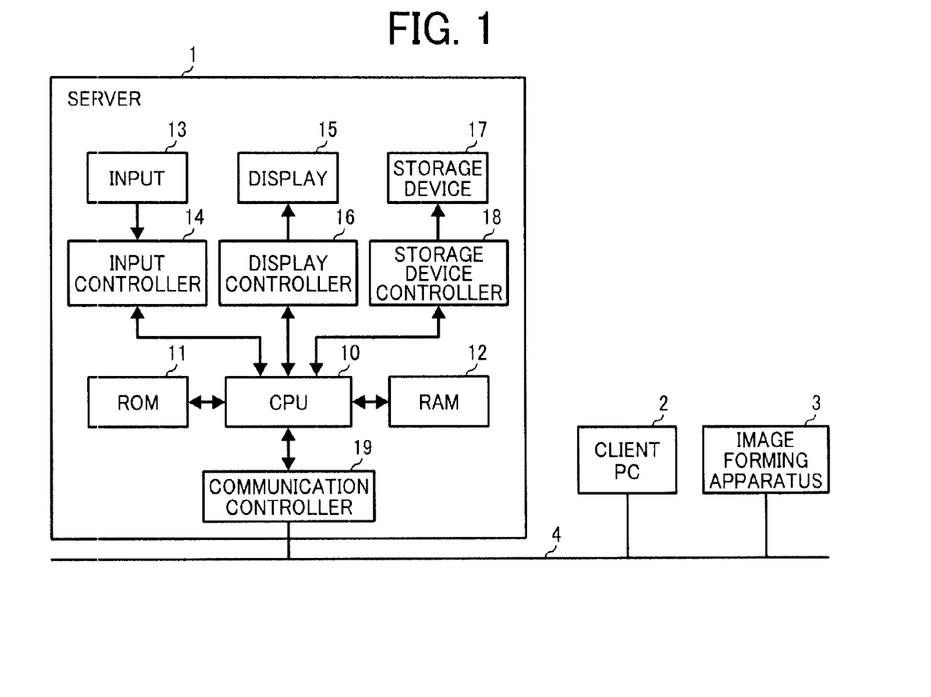
FIG. 1 is a schematic block diagram illustrating a configuration of a printing system including an information processing apparatus, according to an example embodiment of the present invention.

Referring to FIG. 1, a configuration of a printing system 1 is explained according to an example embodiment of the present invention. The printing system of FIG. 1 includes a server 1, a client 2, and an image forming apparatus 3, which are connected through a network 4. The server 1 and the client 2 are each implemented by a computer such as a personal computer (PC). In this example, the image forming apparatus 3 is implemented by a printer or a multifunctional apparatus capable of performing operation of printing. Further, in this example, any number of client 2 or image forming apparatus 2 may be provided. In the printing system of FIG. 1, according to an instruction received from the client 2, the server 1 instructs the image forming apparatus 3 to perform printing operation.

Still referring to FIG. 1, a hardware structure of the server 1 is explained. The server 1 includes a central processing unit (CPU) 10, a read only memory (ROM) 11, a random access memory (RAM) 12, an input 13, an input controller 14, a display 15, a display controller 16, a storage device 17, a storage device controller 18, and a communication controller 19.

The CPU 10 functions as a main controller that controls the entire operation of the server 1. The RAM 12 function as a work area for the CPU 10. The ROM 11 stores various control programs such as a printer driver control program. The CPU 10 loads a control program from the ROM 11 onto the RAM 12 to perform various functions according to the loaded program.

The input 13 inputs various information such as a user instruction received from the user, and may be implemented by a keyboard, a mouse, etc. The input controller 14 sends various information input through the input 13 to the CPU 10.

The display 15 displays various information to the user, and may be implemented by a liquid crystal display (LCD). The display controller 16 sends data to be displayed, which is received from the CPU 10, to the display 15 to cause the display 15 to display various screens or information based on the data to be displayed.

The storage device 17 stores various data, and may be implemented by a hard disk drive (HDD). The storage device controller 18 writes various data received from the CPU 10 onto the storage device 17. When a request for specific data is received from the CPU 10, the storage device controller 18 sends the specific data read out from the storage device 17 to the CPU 10.

The communication controller 19 controls communication established between the server 1 and any other apparatus such as the client 2 or the image forming apparatus 3 through the network 4. For example, the communication controller 19 sends data received from the CPU 10 to any one of the client 2 and the image forming apparatus 3. In another example, the communication controller 19 sends data received from any one of the client 2 and the image forming apparatus 3 to the CPU 10.

Figure 2:
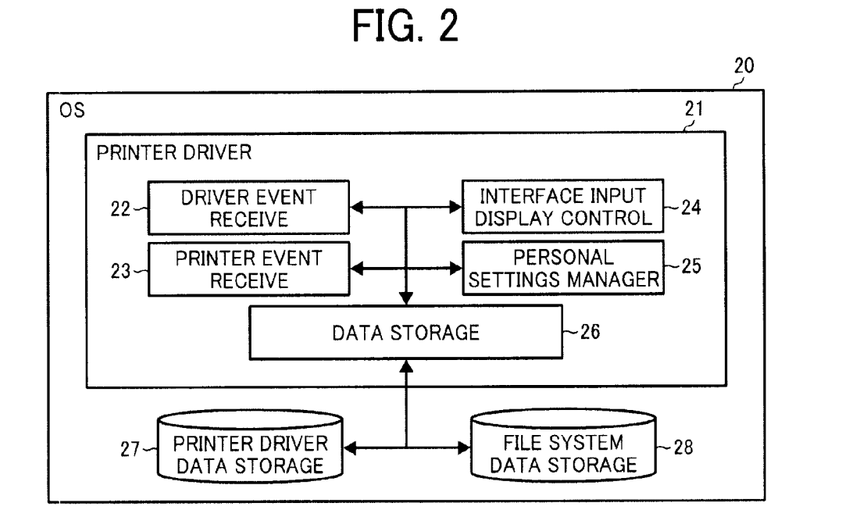
FIG. 2 is a schematic block diagram illustrating a functional structure of the information processing apparatus illustrated in FIG. 1.

Referring to FIG. 2, a functional structure of the server 1 is explained according to an example embodiment of the present invention. The server 1 is installed with an operating system (OS) 20 such as the Windows OS. In addition to the OS 20, the server 1 may be provided with an application program such as a word processing program, a spreadsheet program, etc. Further, when the OS 20 executes the printer driver control program, the server 1 is caused to have a printer driver 21, which controls printing operation of the image forming apparatus 3. For example, when an instruction for printing data is received from the client 2, the printer driver 21 of the server 1 causes the image forming apparatus 3 to perform printing according to print settings information set by the client 2.

Referring to FIG. 2, the server 1 further includes a printer driver data storage 27 and a file system data storage 28. The printer driver data storage 27 is a registry area of the storage device 17 (FIG. 1) for use by the OS 20. The OS 20 provides the printer diver data storage 27 for each logical printer of the printer driver 21 to store therein various data generated for each logical printer such as printer driver data, which is described below referring to FIG. 7. The OS 20 may refer to, modify or delete the printer driver data stored in the printer drier data storage 27 at any desired time. Further, in this example, only an authorized user such as an administrator of the printing system may be authorized to write data in the printer driver data storage 27.

The file system data storage 28 is a storage area of the storage device 17 (FIG. 1), which stores and manages various data to be used by a file system of the OS 20.

The printer driver 21 includes a driver event receive 22, a printer event receive 23, an interface input display control 24, a personal settings manager 25, and a data storage 26. The driver event receive 22 receives an event related to a printer driver ("the driver event") sent by the OS 20 including, for example, a driver install event to install a printer driver onto the server 1 and a driver uninstall event to uninstall a printer driver from the server 1. The driver event receive 22 notifies the data storage 26 of the receipt of the driver event.

The printer event receive 23 receives an event related to a logical printer ("the printer event") sent by the OS 20 including, for example, a logical printer add event to add a logical printer to the printing system and a logical printer delete event to delete a logical printer from the printing system. The printer event receive 23 notifies the data storage 26 of the receipt of the printer event.

The interface input display control 24 controls a printer driver user interface. For example, the interface input display controller 24 controls information regarding the print settings, which is displayed through the display 15 (FIG. 1) as a printer driver property screen. In another example, the interface input display control 24 controls a user input received from the user through the printer driver property screen, which indicates a user instruction for inputting or modifying various print settings displayed through the printer driver property screen.

The personal settings manager 25 controls generation or storage of one-click settings data for each user or each group of users. In this example, the one-click settings data includes information regarding a plurality of print settings items and a parameter value of each one of the print settings items, which together indicate specific print settings to be used for printing. The one-click settings data is generated and stored for each user or each group of users such that the user is able to recall the print settings at any desired time.

The data storage 26 manages various data stored in the storage device 17 of the server 1 through the file system data storage 28. The data storage 26 creates a directory structure of the data files stored in the file system data storage 28 to manage the data files. More specifically, the data storage 26 classifies the data files by printer driver, logical printer, user, or group of users, to generate the directory structure of the data files in layer or in a tree structure. For example, the data storage 26 may create a driver data directory for a specific printer driver, a printer data directory for a specific logical printer, etc. Further, at the time of deleting a specific logical printer, the data storage 26 deletes all data files, which are classified under a printer data directory created for the specific logical printer, from the file system data storage 28. At the time of uninstalling a specific printer driver, the data storage 26 deletes all data files, which is classified under a driver data directory created for the specific printer driver, from the file system data storage 28.

Figure 3:
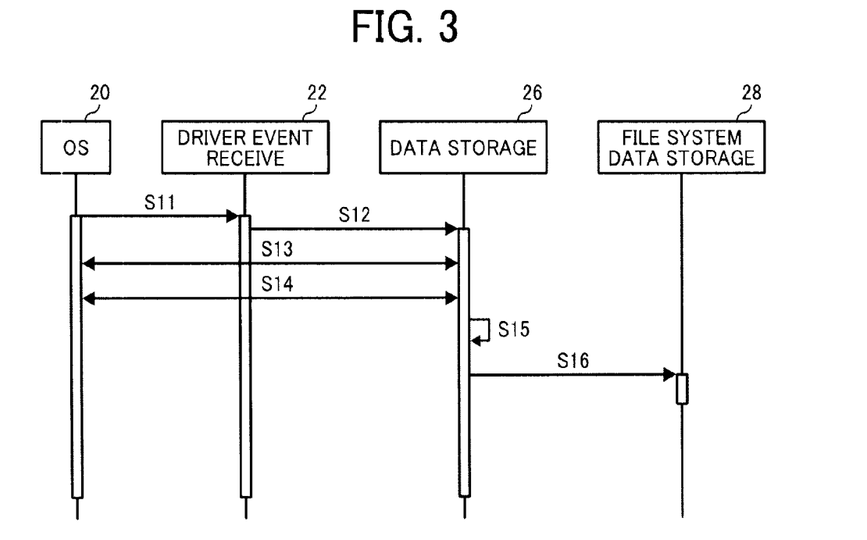
FIG. 3 is a data flow diagram illustrating operation of installing a printer driver, performed by the information processing apparatus of FIG. 1.

Referring to FIG. 3, operation of installing a printer driver onto the server 1 is explained according to an example embodiment of the present invention. The operation of FIG. 3 is performed by the server 1, for example, when the server 1 receives a user instruction for installing the printer driver for the image forming apparatus 3 from the user through the input 13.

At S11, the OS 20 copies the files obtained from a package of the printer driver onto a printer driver directory that is created in a file system of the storage device 17. In this example, the package of the printer driver may be stored in any desired memory or a recording medium. The OS 20 sends a driver install event to the printer driver 21, for example, by specifying the "DRIVER_EVENT_INITIALIZE" in an argument of the "DrvDriverEvent" command. The driver event receive 22 receives the driver install event sent by the OS 20.

At S12, the driver event receive 22 requests the data storage 26 to generate a driver data directory for the printer driver being installed. The driver data directory is used to store print settings data to be used for the printer driver.

The data storage 26 determines at which location in the file system of the storage device 17 the driver data directory should be generated, for example, using the following procedure.

At S13, the data storage 26 obtains a common application data directory path from the OS 20, for example, by specifying the "CSIDL_COMMON_APPDATA" in an argument of the "SHGetSpecialFolderPath" of the "WindowsAPI". Assuming that a drive to which the printer driver is installed is the C drive under the Windows XP operating system, the common application data directory path is "C:¥Documents and Settings¥All Users¥Application Data¥". If the printer driver is to be installed to the C drive under the Windows Vista operation system, the common application data directory path is the "C: ¥ProgramData¥". In this example, the character ¥ is recognized as a delimitating character. For the delimitating character, any other character such as the backslash may be used.

At S14, the data storage 26 obtains "PrinterInfo" from the OS 20 to determine a name of the printer driver, for example, by using the "GetPrinter" command of the "WindowsAPI".

At S15, the data storage 26 specifies a driver data directory path based on the "PrinterInfo" regarding the printer driver name and the common application data directory path. More specifically, the data storage device 26 determines a driver data directory path by adding the printer driver name to the common application data directory path.

For example, assuming that the printer driver is to be installed to the drive C under the Windows Vista operating system, if the printer drive name is "Hello Driver", the driver data directory path is determined to be "C: ¥Program Data¥Hello Driver".

In case when the printer driver name includes any character that is not permitted for use as a Windows file system path, such as the slash "/", such character not permitted for use will be automatically replaced with any other character that is permitted for use such as the character "-".

At S16, the data storage 26 determines the specific location at which the printer driver should be installed based on the driver data directory path specified at S15, and the operation ends. The data storage 26 generates a directory in the file system data storage 28 at the location indicated by the driver data directory path. The directory may be generated, for example, by using the "CreateDirectory" command of the "WindowsAPI".

Figure 4:
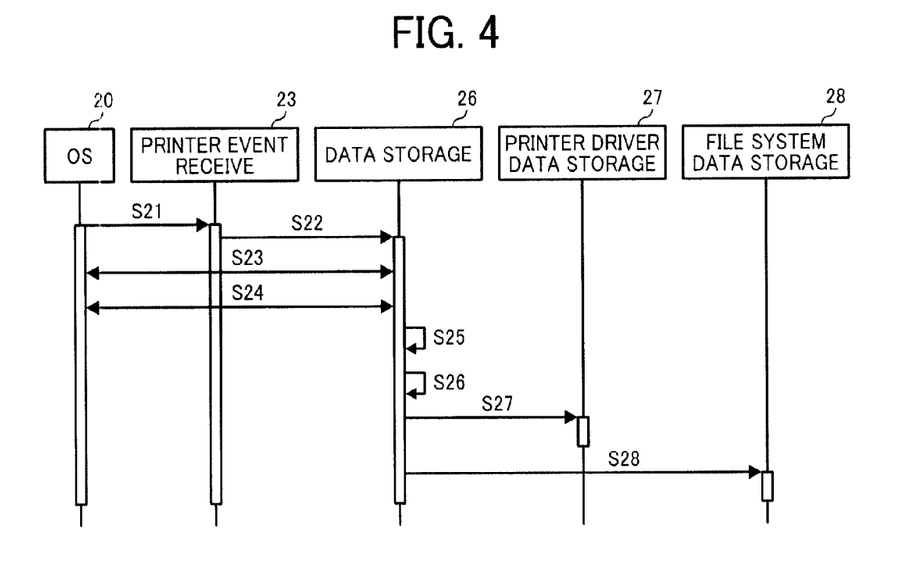
FIG. 4 is a data flow diagram illustrating operation of adding a logical printer, performed by the information processing apparatus of FIG. 1.

Referring to FIG. 4, operation of adding a logical printer onto the printing system of FIG. 1 is explained according to an example embodiment of the present invention. In this example, the logical printer is displayed as a printer icon in the printer folder of the Windows operating system when added. For one package of the printer driver, more than one logical printer may be generated. For example, when more than one printer of the same machine type is provided within the same office, more than one logical printer may be provided for one printer driver prepared for the printer of the same machine type. After performing installation of the printer driver as described above referring to FIG. 3, a logical printer may be added as described below referring to FIG. 4. Alternatively, as long as the printer driver has been installed, a logical printer may be added at any desired time, for example, through the client 2 that is logged onto the printing system of FIG. 1.

At S21, the OS 20 sends a printer install event to the printer driver 21 to request for addition of a logical printer, for example, by specifying the "PRINTER_EVENT_INITIALIZE" in an argument of the "DrvPrinterEvent" function command. The printer event receive 23 receives the printer install event sent by the OS 20.

At S22, the printer event receive 23 requests the data storage 26 to generate a printer data directory for the logical printer being added. The printer data directory is used to store print settings data to be used for the logical printer being added. The printer data directory is generated under the driver data directory that has been created, for example, as described above referring to FIG. 3.

The data storage 26 determines at which location in the file system of the storage device 17 the printer data directory should be generated, for example, using the following procedure.

At S23, the data storage 26 specifies a driver data directory path in a substantially similar manner as described above referring to FIG. 3. More specifically, the data storage 26 obtains a common application data directory path from the OS 20 as described above referring to S13 of FIG. 3, and "PrinterInfo" from the OS 20 to determine a name of the specific printer driver as described above referring to S14 of FIG. 3. The common application data directory path and the printer driver name are combined to specify the driver data directory path.

At S24, the data storage 26 specifies a printer data directory path under the driver data directory path. For example, the data storage 26 obtains a logical printer name using the "Printerinfo", which is obtained using the "GetPrinter" command of the "WindowsAPI". In case when any character that is not permitted for use as the file system path is obtained for the logical printer name using the "Printerinfo", such character may be removed.

Further, in case when the number of characters obtained for the logical printer name using the "Printerinfo" exceeds a predetermined number, the number of characters obtained for the logical printer name is adjusted such that the number of characters used for the logical printer name does not exceed the predetermined number. For example, the maximum number of characters that can be set as the logical printer name is set to 220 characters.

Further, the maximum number of characters that can be used as a file path under the Windows system is determined to be 260 characters. The data storage 26 specifies the printer data directory path that is short enough such that the number of characters for the file path does not exceed this upper limit.

Figure 5:
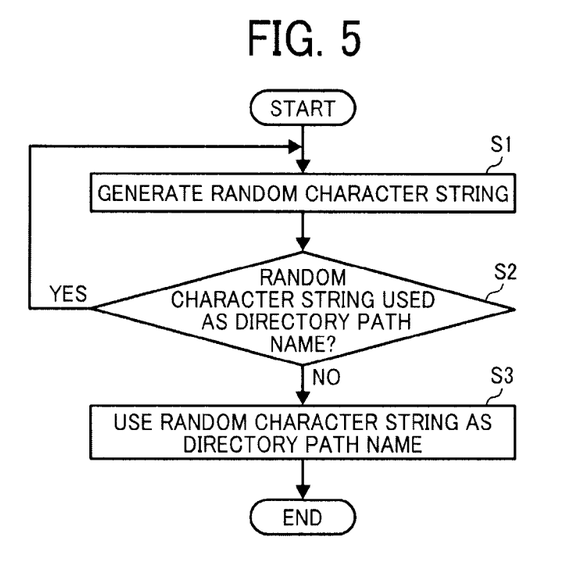
FIG. 5 is a flowchart illustrating operation of specifying a printer data directory path, performed by the information processing apparatus of FIG. 1.

In case when the number of characters obtained for the logical printer name or for the file path exceeds the upper limit, the data storage 26 specifies a printer data directory path, for example, as described below referring to FIG. 5.

At S1, the data storage 26 generates a random character string having a number of characters equal to or less than the maximum number of characters that can be used as the file path under the Windows system, which is set to 260 characters. For example, the data storage 26 may obtain a random sequence number that is an initialized data sequence generated at a current time counted by the OS 20, and convert the obtained random sequence number to the random character string. The random number sequence may be converted in the 16 number system or the 36 number system to generate the random character string that is relatively small in number of characters.

At S2, the data storage 26 determines whether the random character string generated al S1 has been used as a directory path for any direction generated under the driver data directory. When it is determined that the random character string has been already used ("YES" at S2), the operation repeats S1 to generate another random character string. When it is determined that the random character string has not been used ("NO" at S2), the operation proceeds to S3.

At S3, the data storage 26 determines to use the random character string generated at S1 for the printer data directory path name, and the operation ends.

Referring back to FIG. 4, at S27, the data storage 26 stores the printer driver data including the printer data directory path name specified at S26 in the printer driver data storage 27, for example, using the "SetPrinter API" command. In this example, the printer driver data storage 27 is a registry area for storing the printer driver data for the logical printer, and managed by the OS 20. The printer driver data stored in the printer driver data storage 27 is managed in association with the logical printer name. For example, even when the logical printer name has been changed, the printer driver data may be referred by a logical printer instance to obtain information regarding the specific logical printer. More specifically, since the printer data directory path name is stored in the printer driver data storage 27, the printer data directory name may be accurately referred even when the logical printer name is changed.

At S28, the data storage 26 generates a directory having the printer data directory path name that is specified as described above referring to FIG. 26 under the driver data directory, and the operation ends.

Figure 6:
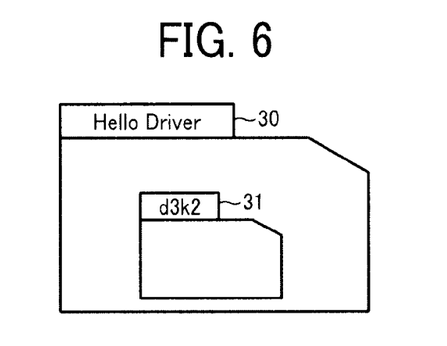
FIG. 6 is an illustration for explaining an example directory structure including a driver data directory and a printer data directory, respectively created by the information processing apparatus of FIG. 1.

FIG. 6 illustrates an example directory structure including a driver data directory and a printer data directory, which may be respectively generated as described above referring to FIGS. 3 and 4. In the file system data storage 28, the driver data directory 30 with the name "Hello Driver" is generated. Under the "Hello Driver" directory, the printer data directory 31 with the name "d3k2" is generated. The printer data directory name "d3k2" is a directory name generated based on the random character string as described above referring to FIG. 5. These directories are each managed by the OS 20 such that the OS 20 may refer to or delete at any desired time.

Figure 7:
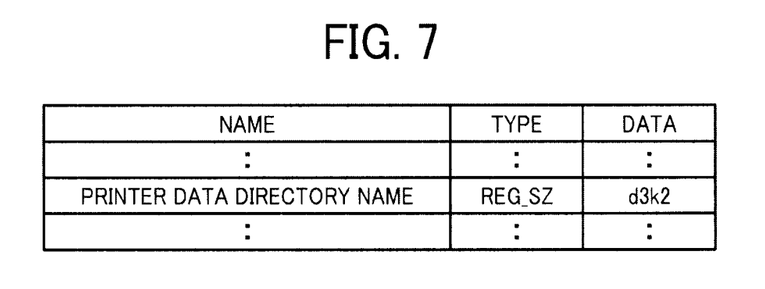
FIG. 7 is an illustration for explaining printer driver data stored in the information processing apparatus of FIG. 1 when the printer data directory is created.

FIG. 7 is an example of the printer driver data stored in the printer driver data storage 27 after the printer data directory 31 is generated. The printer driver data of FIG. 7 includes the character string "d3k2", which is stored in association with the "Printer Directory Name" key. The type "REG_SZ" indicates that the name "d3k2" of the printer data directory is a character string. After the logical printer is added, the printer driver data of FIG. 7 may be referred at any desired time to obtain information regarding the printer data directory such as the printer data directory name.

Figure 8:
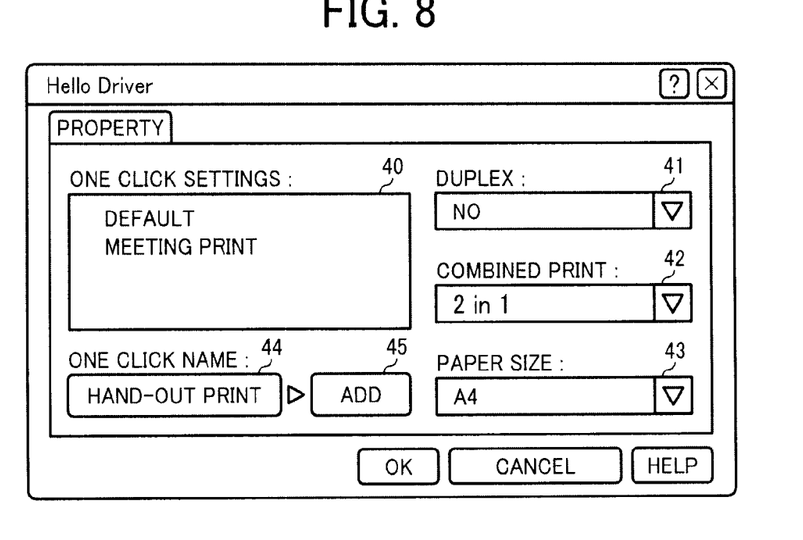
FIG. 8 is an example printer driver property screen displayed by the information processing apparatus of FIG. 1.

Referring now to FIG. 8, operation of generating the one-click settings data is explained according to an example embodiment of the present invention.

As described above referring to FIG. 2, the interface input display controller 24 controls a printer driver user interface. In one example, the interface input display controller 24 causes the display 15 to display a printer driver property screen, which indicates the print settings of the printer driver. Through the property screen, the user inputs or modifies various print settings for the printer driver. FIG. 8 illustrates an example printer driver property screen displayed by the display 15.

The property screen of FIG. 8 includes a duplex print combo box 41 for setting the duplex print settings, a combined print combo box 42 for setting the combined print settings, and a paper size combo box 43 for setting the paper size settings, which are arranged at a right section of the property screen. The duplex print combo box 41 allows the user to select whether to print an image on a single side of paper or both sides of paper. When the duplex print is selected, the duplex print combo box 41 further allows the user to select a bind side at which the printed sheets are bound. The combined print combo box 42 allows the user to select whether to print a plurality of pages into one sheet of paper. When it is selected to print a plurality of pages into one sheet of paper, the combined print combo box 42 further allows the user to select a number of pages to be printed into one sheet of paper. For example, when two pages is to be printed into one sheet of paper, "2 in 1" is displayed. The paper size combo box 43 allows the user to select a size of paper used for printing. For example, through the paper size combo box 43, the paper size of A4, B5, etc., may be selected. Further, in this example, any desired type of combo box may be displayed. For example, a combo box may be additionally provided to allow the user to select whether to print a one-page image into a plurality of sheets.

The property screen of FIG. 8 further includes a one-click settings list 40, a one-click name edit box 44, and an "Add" button 45. The one-click settings list 40 lists one or more one-click settings data items for selection by the user. In this example, one or more one-click settings data items may be stored, each indicating a set of print settings items that is previously selected through the combo boxes. For example, the "MEETING PRINT" one-click setting data indicates that the duplex print settings of "YES, left-bind", the combined print settings of "NO", and the paper size settings of "A4" have been selected and stored. When the user selects the "MEETING PRINT" from the one-click settings list 40 of FIG. 8 using the input 13, the print settings are automatically set according to the print settings stored as the "MEETING PRINT" one-click settings data.

In order to add new one-click settings data, the user may set the print settings using the combo boxes provided in the right section of the printer driver property dialog of FIG. 8. The user then inputs a name to be assigned to the new one-click setting data into the edit box 44, and presses the "Add" button 45. The one-click settings list 40 additionally displays the new one-click setting data. For example, referring to FIG. 8, the duplex print settings of "NO", the combined print settings of "2 in 1", and the paper size settings of "A4" are selected by the user. The user inputs the word "HAND-OUT PRINT" into the one-click name edit box 44. In such case, the print settings are stored as the one-click setting data named "HAND-OUT PRINT".

Figure 9:
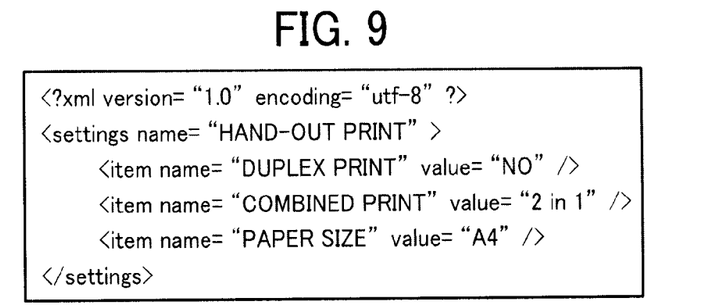
FIG. 9 is an illustration for explaining example one-click settings data stored in the information processing apparatus of FIG. 1.

FIG. 9 illustrates one-click settings data, which is stored with the name "HAND-OUT PRINT". The one-click settings data of FIG. 9 is stored in an XML format. The route tag indicates a "settings name" property having the value "HAND-OUT PRINT" that is set as the name of the one-click settings data through the edit box 44. The "item name" tag indicates the respective print settings items, with the values respectively set for the print settings items. The one-click settings data of FIG. 9 indicates that the duplex print settings of "NO", the combined print settings of "2 in 1", and the paper size settings of "A4" are stored as the one-click settings data having the name "HAND-OUT PRINT".

Figure 10:
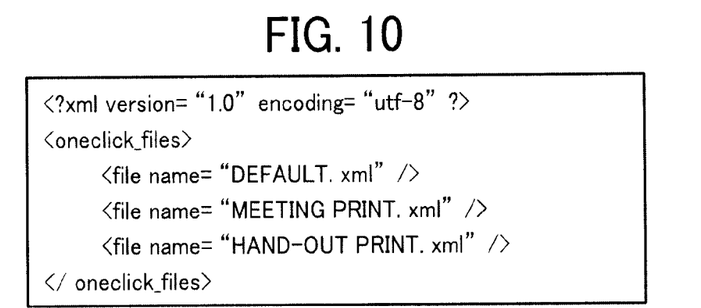
FIG. 10 is an illustration for explaining example one-click list data indicating a list of one-click settings data stored in the information processing apparatus of FIG. 1.

FIG. 10 illustrates one-click list data indicating a list of the one-click data files stored for the user who is currently displayed with the property screen of FIG. 8. The one-click list data may be referred by the printer driver 21 to display the one-click settings list 40. The one-click list data is provided with a plurality of "file name" property tags each indicating the name of the one-click settings data stored for selected by the user. Referring to FIG. 10, the user may select from the one-click settings data having the name "DEFAULT.xml", the one-click settings data having the name "MEETING PRINT.xml", and the one-click settings data having the name "HAND-OUT PRINT.xml".

Figure 11:
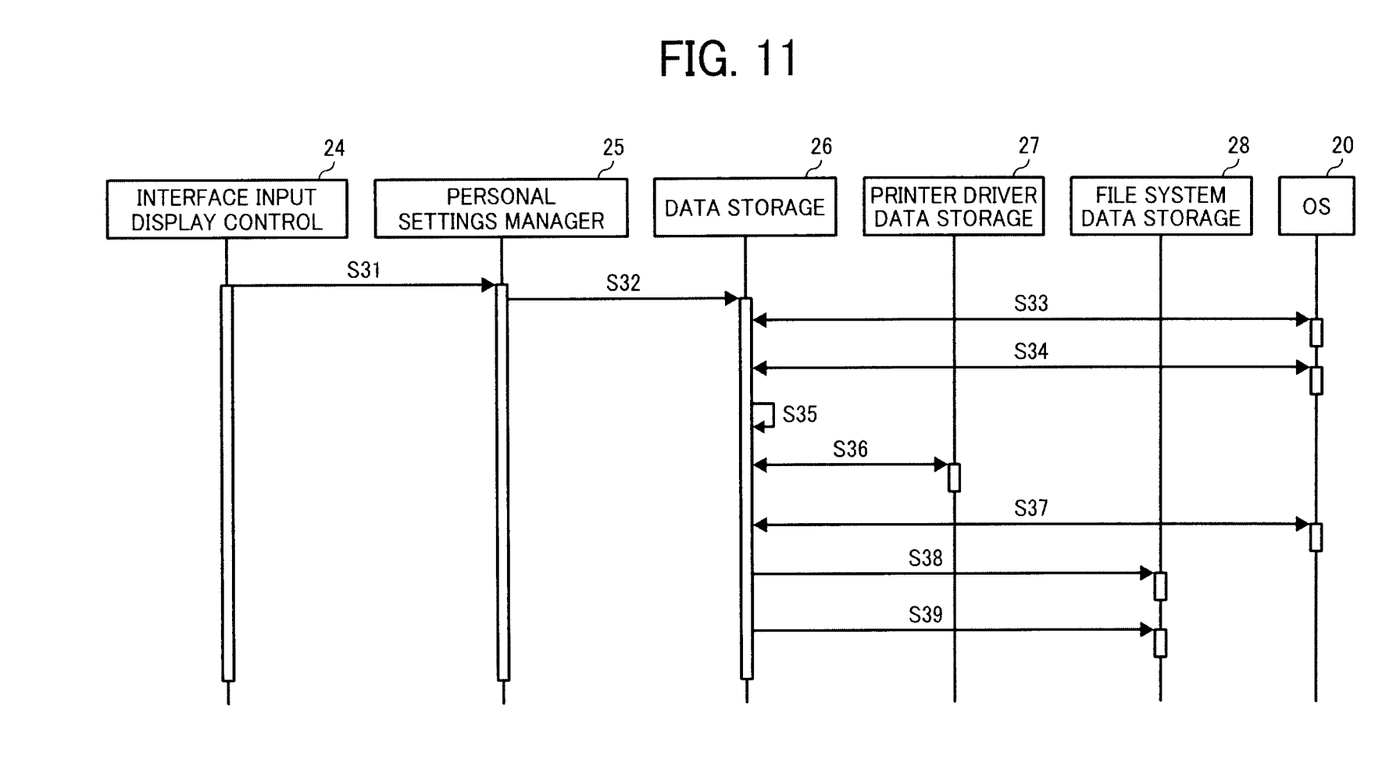
FIG. 11 is a data flow diagram illustrating operation of storing one-click settings data, performed by the information processing apparatus of FIG. 1.

Referring to FIG. 11, operation of storing one-click settings data is explained according to an example embodiment of the present invention. The operation of FIG. 11 may be performed by the server 1 when the user instructs the server 1 to store a set of print settings items as one-click settings data as described above referring to FIG. 8. More specifically, when the "Add" button 45 is pressed after the user selects the set of print settings items through the input 13, the server 1 performs the operation of FIG. 11.

At S31, the interface input display control 24 sends an instruction to the personal settings manager 25 for storing the set of print settings items, which is the print settings data, as the one-click settings data.

At S32, the personal settings manager 25 receives the set of print settings items from the interface input display control 24, and generates the one-click settings data in the XML format based on the set of print setting items. The personal settings manager 25 sends an instruction to the data storage 26 for storing the one-click settings data in association with the one-click settings name input by the user through the edit box 44.

At S33, the data storage 26 obtains a common application data directory path from the OS 20, for example, by specifying the "CSIDL_COMMON_APPDATA" into an argument of the "SHGetSpecialFolderPath" of "WindowsAPI". For example, when the printer driver is installed to the drive C of the Windows XP system, the common application data directory path is "C: ¥Documents and Settings¥All User¥Application Data¥". If the printer driver is to be installed to the C drive under the Windows Vista operation system, the common application data directory path is the "C: ¥ProgramData¥".

At S34, the data storage device 26 obtains "PrinterInfo" from the OS 20 to determine a name of the printer driver, for example, by using the "GetPrinter" command of the "WindowsAPI".

At S35, the data storage 26 specifies a driver data directory path by combining the printer driver name with the common application data directory path. For example, assuming that the printer driver is to be installed to the drive C under the Windows Vista operating system, if the printer drive name is "Hello Driver", the driver data directory path is determined to be "C:¥Program Data¥Hello Driver".

At S36, based on the driver data directory path specified at S35, the data storage 26 obtains the printer data directory path, which is generated under the driver data directory path, from the printer driver data storage 27. More specifically, as described above referring to FIG. 7, the OS 20 may refer to the printer driver data of the printer driver data storage 27 to obtain the printer data directory path.

At S37, the data storage 26 obtains the name of a current user who requests the server 1 to store the print settings data from the OS 20. The current user name may be obtained, for example, by using the "GetUserName" of the "Windows API".

At S38, the data storage 26 generates a user data directory for the current user, under the printer data directory that is stored in the file system data storage 28. For example, the user data directory may be assigned with the current user name obtained at S37.

At S39, the data storage 26 stores the one-click settings data, which is the XML file data, in the user data directory created at S38, and the operation ends. If the one-click settings data having the same file name already exists in the user data directory, the one-click settings data previously stored is overwritten with the one-click settings data that is requested to be added.

In the above-described example, the data storage 26 may store information regarding the user data directory path within the data storage 26 when the user data directory is generated. Once the user data directory path is stored, the data storage 26 may refer to the user data directory path at any desired time.

The above-described operation is not limited to the example case of storing the one-click settings data. Using the above-described operation, the data storage 26 may store any type of print settings data under the file system of the OS 20.

Figure 12:
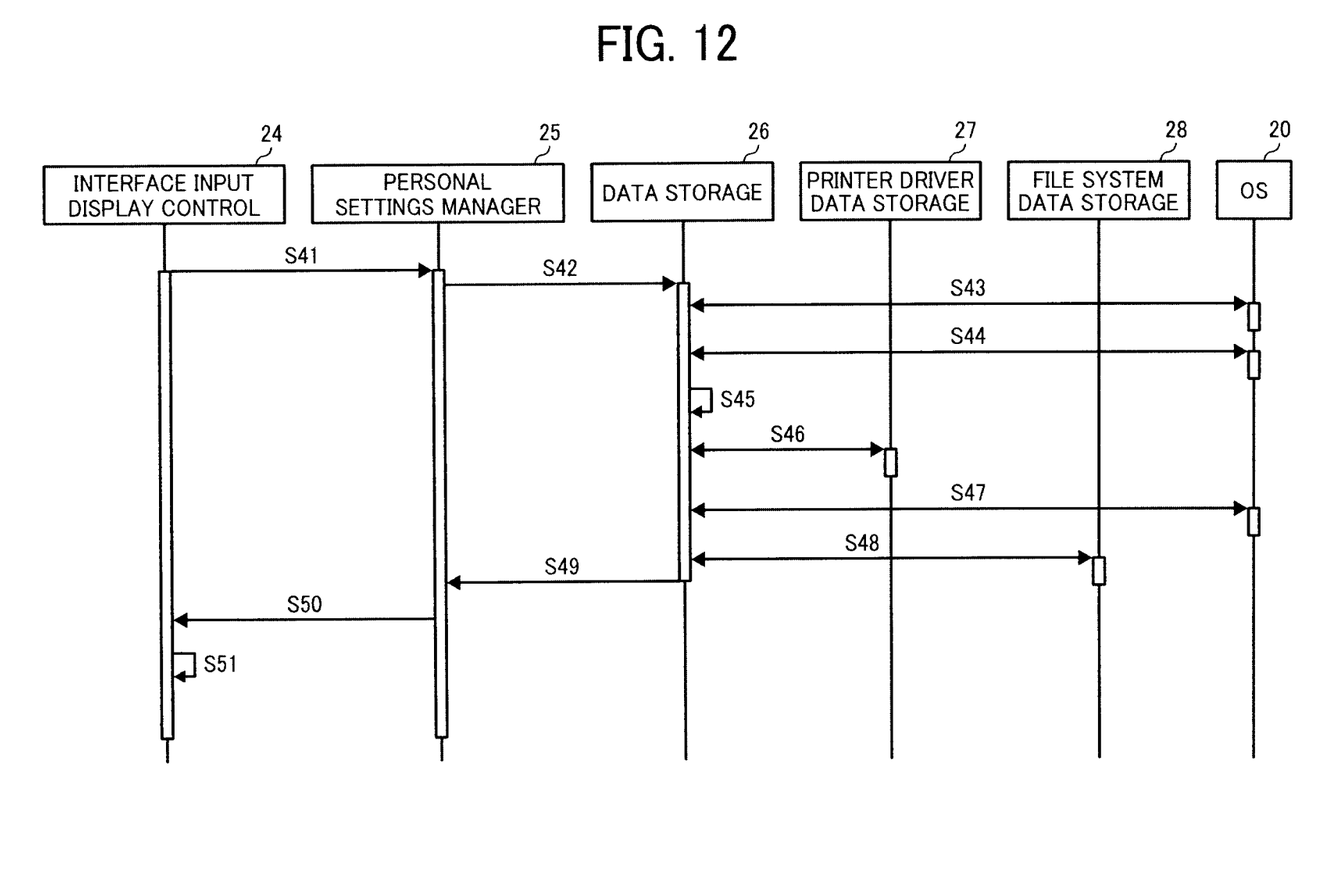
FIG. 12 is a data flow diagram illustrating operation of reading one-click settings data, performed by the information processing apparatus of FIG. 1.

Referring now to FIG. 12, operation of reading the one-click settings data that is generated and stored is explained according to an example embodiment of the present invention. The operation of FIG. 12, which may be called as initialization of one-click settings, may be performed by the server 1 at the time of initializing the interface input display control 24. Alternatively, the operation of FIG. 12 may be performed by the server 1 when the user selects any one of the one-click settings data using the input 13 from a list of the one-click settings data items displayed in the one-click settings list 40 of the printer driver property screen of FIG. 8.

At S41, the interface input display controller 24 sends an instruction for reading the set of print settings items stored as the selected one-click settings data to the personal settings manager 25.

At S42, the personal settings manager 25 requests the data storage 26 to read the set of print settings items stored as the selected one-click settings data. For example, the user may select one of the selected one-click settings data from the one-click settings list 40.

At S43, the data storage 26 obtains a common application data directory path from the OS 20, for example, by specifying the "CSIDL_COMMON_APPDATA" in an argument of the "SHGetSpecialFolderPath" command of the "WindowsAPI".

At S44, the data storage 26 obtains "PrinterInfo" from the OS 20 to determine a name of the printer driver, for example, by using the "GetPrinter" command of the "WindowsAPI".

At S45, the data storage 26 specifies a driver data directory path by combining the printer driver name with the common application data directory path.

At S46, based on the driver data directory path specified at S45, the data storage 26 obtains the printer data directory path, which is generated under the driver data directory path, from the printer driver data storage 27. More specifically, as described above referring to FIG. 7, the OS 20 may refer to the printer driver data of the printer driver data storage 27 to obtain the printer data directory path.

At S47, the data storage 26 obtains the name of a current user who requests the set of print settings items stored as the one-click settings data from the OS 20. The current user name may be obtained, for example, by using the "GetUserName" of "Windows API".

At S48, the data storage 26 reads the one-click settings data from the file system data storage 28, which is stored in the user data directory generated under the printer data directory of the driver data directory.

At S49, the data storage 26 sends information regarding the set of print settings items stored as the one-click settings data to the personal settings manager 25.

At S50, the personal settings manager 25 sends information regarding the set of print settings items stored as the one-click settings data ("print settings information"), which is received from the data storage 26, to the interface input display control 24.

At S51, the interface input display control 24 causes the display 15 to display the printer driver property screen based on the print settings information for the selected one-click settings data. At the same time, the printer driver 21 is set with the print settings information of the one-click settings data, and the operation ends.

In the above-described example, the data storage 26 may store information regarding the user data directory path within the data storage 26 when the one-click settings data is read. Once the user data directory path is stored, the data storage 26 may refer to the user data directory path at any desired time.

The above-described operation is not limited to the example case of reading the one-click settings data. Using the above-described operation, the data storage 26 may read any type of print settings data under the file system of the OS 20.

Figure 13:
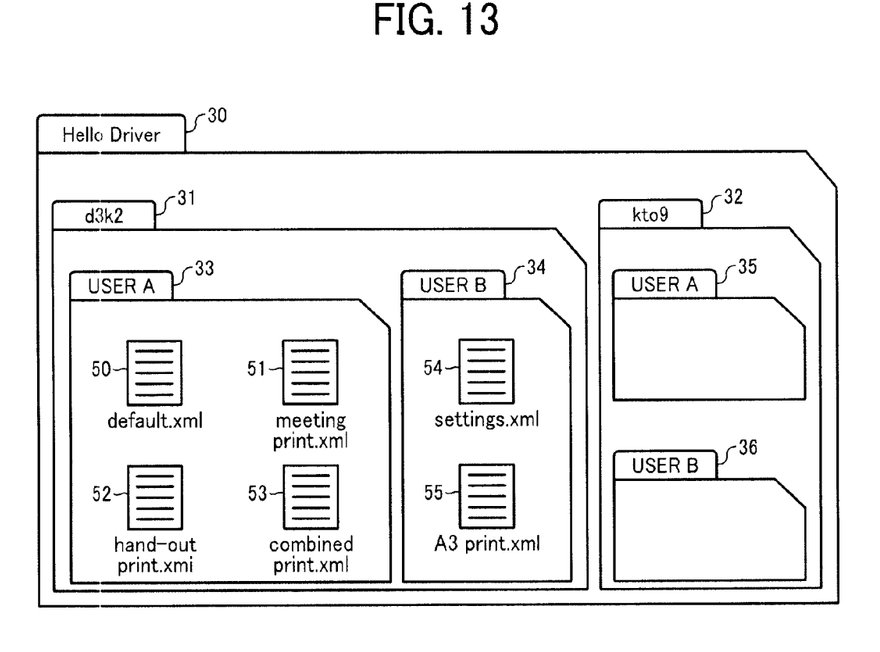
FIG. 13 is an illustration for explaining an example directory structure including a driver data directory, a printer data directory, and a user data directory, respectively created by the information processing apparatus of FIG. 1.

FIG. 13 illustrates an example directory structure of the file system data storage 28, which is generated by the data storage 26 as described above referring to FIG. 11. In this example, two logical printers are registered for the image forming apparatus 3 of the printing system of FIG. 1. Further, two users including the user A and the user B are currently logged onto the printing system of FIG. 1.

The file system data storage 28 includes the driver data directory 30 with the name "Hello Driver". Under the driver data directory 30, the printer data directory 31 with the name "d3k2" and the printer data directory 32 with the name "kto9" are respectively generated.

The printer data directory 31 includes the user data directory 33 with the name "USER A", and the user data directory 34 with the name "USER B". Under the printer data directory 32, the user data directory 35 with the name "USER A" and the user data directory 36 with the name "USER B" are respectively generated for the user A and the user B. The user data directories 33 and 34 respectively store therein print settings data generated for the user A and the user B. For example, the user data directory 33 stores therein the one-click settings data "default.xml" 50, the one-click settings data "meeting print.xml" 51, the one-click settings data "hand-out print.xml" 52, and the one-click settings data "combined print.xml" 53, each of which has been generated for the user A.

With this directory structure having a driver data directory, a printer data directory, and a user data directory, the OS 20 manages the print settings data for one or more printer drivers by printer driver, logical printer, and user. For example, in case when the printer driver is uninstalled, the OS 20 deletes all data files stored under the driver data directory. In case when a specific logical printer is deleted, the OS 20 deletes all data files stored under the printer data directory generated for the specific logical printer. In case when a specific user is logged out from the printing system of FIG. 1, the OS 20 deletes all data files stored under the user data directory generate for the specific user.

Figure 14:
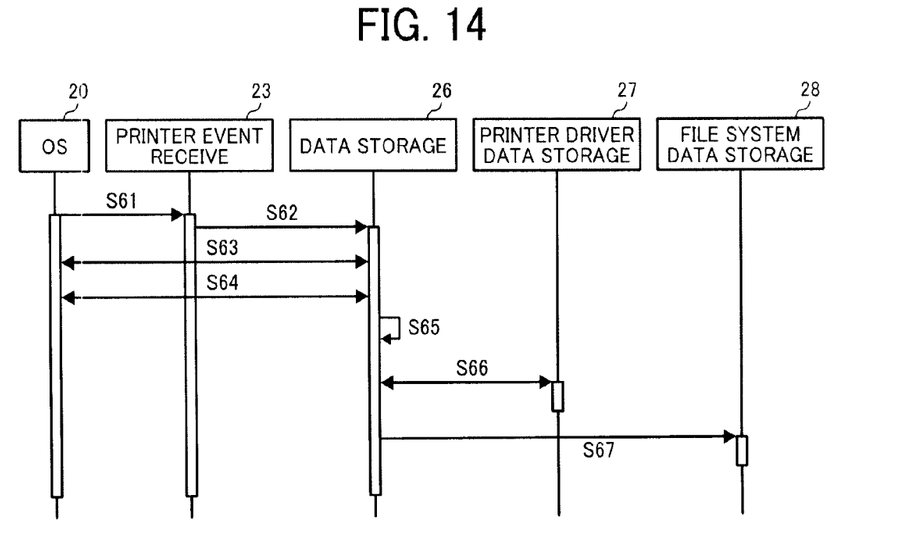
FIG. 14 is a data flow diagram illustrating operation of deleting a printer data directory when a logical printer is deleted, performed by the information processing apparatus of FIG. 1.

Referring to FIG. 14, operation of deleting a logical printer from the printing system of FIG. 1 is explained according to an example embodiment of the present invention. The operation of FIG. 14 may be performed by the server 1 at any desired time, for example, when the user at the client 2 logs out from the printing system of FIG. 1.

At S61, the OS 20 of the server 1 sends a printer uninstall event to the printer driver 21 to request for deletion of a logical printer. The printer event receive 23 receives the printer uninstall event sent by the OS 20.

At S62, the printer event receive 23 requests the data storage 26 to delete the printer data directory generated for the logical printer being deleted.

At S63, the data storage 26 obtains a common application data directory path from the OS 20, for example, by specifying the "CSIDL_COMMON_APPDATA" in an argument of the "SHGetSpecialFolderPath" command of the "WindowsAPI".

At S64, the data storage 26 obtains "PrinterInfo" from the OS 20 to determine a name of the printer driver, for example, by using the "GetPrinter" command of the "WindowsAPI".

At S65, the data storage 26 specifies a driver data directory path by combining the printer driver name with the common application data directory path.

At S66, based on the driver data directory path specified at S65, the data storage 26 obtains the printer data director path, which is generated under the driver data directory path for the logical printer being deleted, from the printer driver data storage 27. More specifically, as described above referring to FIG. 7, the OS 20 may refer to the printer driver data of the printer driver data storage 27 to obtain the printer data directory path for the logical printer being deleted.

At S67, based on the driver data directory path and the printer data directory path, the data storage 26 deletes the specified printer data directory and all files stored in the specified printer data directory, and the operation ends.

As described above referring to FIG. 14, when deletion of a specific logical printer is requested, all print settings data files generated for the logical printer being deleted is deleted. More specifically, the one-click settings data generated for each user and stored under the printer data directory for the logical printer being deleted is all deleted.

Further, as described above, the printer data directory is uniquely assigned with a specific name such that the OS 20 is able to identify the printer data directory generated for a specific logical printer. Further, as described above, the name of the printer data directory is stored in the printer driver data storage 27 as the printer driver data. With this printer driver data, the OS 20 is able to identify the printer data directory generated for the specific logical printer even when the name of the printer data directory is changed. With this structure, all print settings data files stored under the printer data directory generated for a specific logical printer are deleted when the specific logical printer is deleted.

For example, under the MetaFrame environment, the server 1 adds a logical printer for each session. Further, the server 1 assigns a different name to the logical printer being added for each session. Even in such case, the print settings data stored under the print data directory generated and named for each session is all deleted when the logical printer is deleted, for example, at the time of ending the session. Thus, a memory space of the printing system 1 is used more efficiently.

Figure 15:
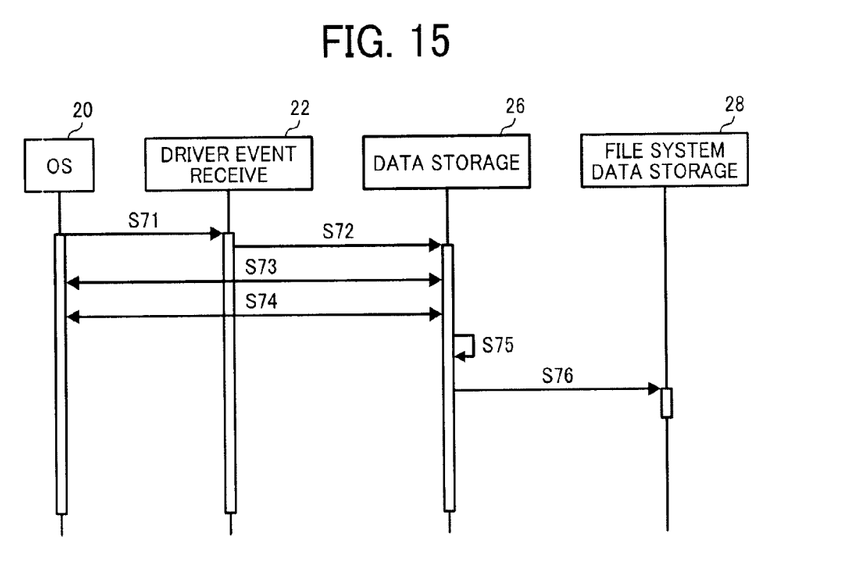
FIG. 15 is a data flow diagram illustrating operation of deleting a driver data directory when a printer driver is uninstalled, performed by the information processing apparatus of FIG. 1.

Referring to FIG. 15, operation of deleting a driver data directory is explained according to an example embodiment of the present invention. The operation of FIG. 15 may be performed by the server 1 when a user instruction for uninstalling the printer driver from the server 1 is received. At the time of uninstalling the printer driver, the driver data directory generated for the printer driver being uninstalled is deleted.

At S71, the OS 20 of the server 1 sends a driver uninstall event to the printer driver 21, which requests for uninstalling a specific printer driver. The driver event receive 22 receives the driver uninstall event sent by the OS 20.

At S72, the driver event receive 22 requests the data storage 26 to delete the driver data directory generated for the printer driver being uninstalled.

At S73, the data storage 26 obtains a common application data directory path from the OS 20, for example, by specifying the "CSIDL_COMMON_APPDATA" in an argument of the "SHGetSpecialFolderPath" command of the "WindowsAPI".

At S74, the data storage 26 obtains a "PrinterInfo" from the OS 20 to determine a name of the printer driver, for example, by using the "GetPrinter" command of the "WindowsAPI".

At S75, the data storage 26 specifies a driver data directory path by combining the printer driver name with the common application data directory path.

At S76, based on the driver data directory path specified at S75, the data storage 26 deletes the specified driver data directory and all files stored in the specified driver data directory, and the operation ends.

As described above referring to FIG. 15, when it is requested to uninstall a printer driver, the print settings data generated for the printer driver being uninstalled is deleted. More specifically, the one-click settings data generated for each user and stored under the printer data directory of the driver data directory for the printer driver being uninstalled is all deleted.

In any one of the above-described example, in addition to generating a user data directory for an individual user, a group data directory may be generated and stored for a group of individual users, for example, as described below referring to FIGS. 16 and 17. In such case, one or more group directories may be created under the printer data directory.

Figure 16:
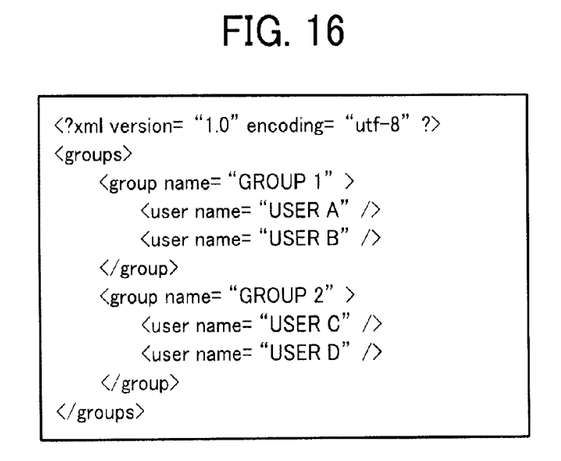
FIG. 16 is an illustration for explaining group definition file data.

FIG. 16 illustrates example group definition file data used for classifying each user by group. The group definition file data includes a route tag "groups", which defines the classification of groups using a plurality of types of group property tags.

The group name property tag defines a group name assigned to each group for identifying the group. Under the group name property tag, a plurality of user name tags is provided. The user name property tag defines a name of a user who belongs to the group specified by the group name property tag. In this example, the name of the user is the same as the login name of the user.

For example, referring to FIG. 16, the user named "USER A" and the user named "USER B" belong to the group named "GROUP 1". The user named "USER C" and the user named "USER D" belong to the group named "GROUP 2".

Since the print settings data generated for the printer driver is managed by group of users, the print settings data may be shared among a plurality of users of the same group.

Figure 17:
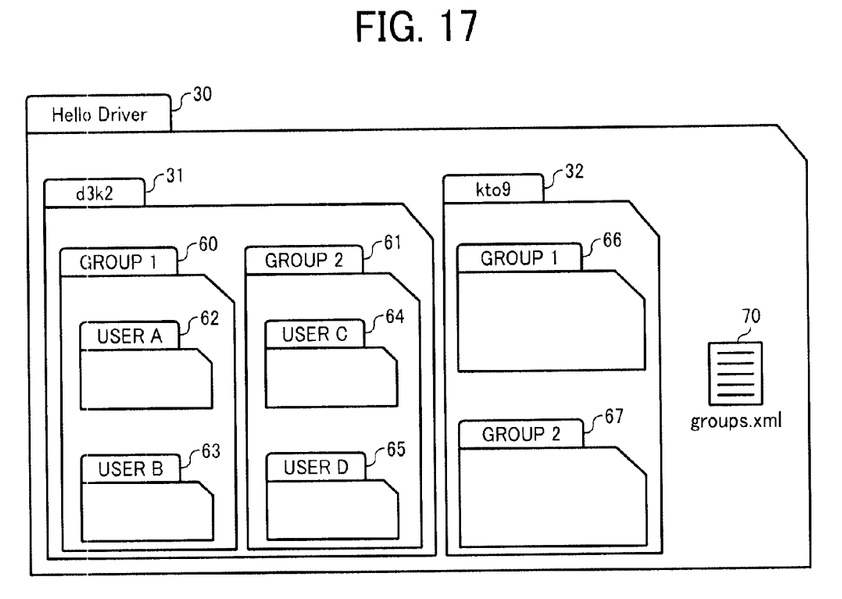
FIG. 17 is an illustration for explaining an example directory structure including a driver data directory, a printer data directory, a group data directory, and a user data directory, respectively created by the information processing apparatus of FIG. 1.

FIG. 17 illustrates an example directory structure including a plurality of directories of the printer driver, which is managed by a group of users. With the use of the directory structure of FIG. 17, the print settings data may be managed by a group of users.

In this example, the group definition file data 70 having the file name "groups.xml" is previously stored in the driver data directory "Hello Driver" 30. The group definition file data 70 defines the classification of group of users as described above referring to FIG. 16. The group definition file data 70 may be previously included in the package of the printer driver such that the group definition file data 70 may be copied onto the driver data directory at the time of installing the printer driver.

When the group definition file data 70 is provided, the data storage 26 specifies a user data directory by referring to the group definition file data 70 in alternative to just referring to the current user name. More specifically, once the current user name is obtained from the OS 20, the data storage 26 refers to the group definition file data 70 to specify a group to which the current user belongs, and uses the name of the specified group as a user data directory name. The data storage 26 generates a group data directory for each group under the printer data directory as defined by the group definition file data 70, and further generates a user data directory for each user under the group data directory generated for each group.

As illustrated in FIG. 17, the file system data storage 28 generates the driver data directory 30 with the name "Hello Driver". Under the driver data directory 30, the printer data directory 31 with the name "d3k2" and the printer data directory 32 with the name "kto9" are respectively generated.

Under the "d3k2" printer data directory 31, the group data directory 60 with the name "GROUP 1" and the group data directory 61 with the name "GROUP 2" are respectively generated for the group 1 and the group 2 according to the group definition file data 70.

Under the group data directory 60, the user data directory 62 with the name "USER A" and the user data directory 63 with the name "USER B" are respectively generated for the user A and the user B. Under the group data directory 61, the user data directory 64 with the name "USER C" and the user data directory 65 with the name "USER D" are respectively generated for the user C and the user D. The user data directories 62, 63, 64, and 65 respectively store therein print settings data such as the one-click settings data generated for the user A, the user B, the user C, and the user D.

Under the "kto9" printer data directory 32, the group data directory 66 with the name "GROUP 1" and the group data directory 67 with the name "GROUP 2" are respectively generated for the group 1 and the group 2 according to the group definition file data 70 in a substantially similar manner as described above referring to the case of the "d3k2" printer data directory 31. Under the group data directory 66, the user data directory with the name "USER A" and the user data directory with the name "USER B" are respectively generated for the user A and the user B. Under the group data directory 67, the user data directory with the name "USER C" and the user data directory with the name "USER D" are respectively generated for the user C and the user D. The user data directories respectively store therein print settings data such as the one-click settings data generated for the user A, the user B, the user C, and the user D.

With this directory structure, the print settings data may be shared by a plurality of users within the same group. For example, the group may be defined based on a company organization including various groups such as a development group or a management group. Since the users of the same group tend to use the print settings data having the same parameter values, managing the print settings data by group of users may effectively save a limited memory space of the printing system 1 of FIG. 1.

As described above, in this example, the server 1 stores and manages the print settings information generated for a printer driver, using a driver data directory generated for the printer driver being installed. The driver data directory is assigned with a specific name that is generated for the printer driver being installed. Since a file path for the driver data directory is uniquely assigned to the driver data directory, the OS 20 is able to easily manage the data files stored under the driver data directory. More specifically, all data files stored under the driver data directory are deleted when the printer driver is uninstalled from the server 1.

Further, the server 1 stores and manages the print settings information generated for a logical printer, using a printer data directory generated for the logical printer being added. The printer data directory is assigned with a specific name that is generated for the logical printer being added. Since a file path for the printer data directory is uniquely assigned to the printer data directory, the OS 20 is able to easily manage the data files stored under the printer data directory. More specifically, all data files stored under the printer data directory are deleted when the logical printer is deleted from the printing system. Further, the name of the printer data directory assigned to the logical printer is stored in the printer driver data storage 28 managed by the OS 20 as the printer driver data. With this printer driver data, the OS 20 is able to identify the printer data directory for a specific logical printer even when the name of the printer data directory is changed.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, the image forming apparatus 3 of FIG. 1 may be implemented by any desired type of image forming apparatus such as a facsimile, printer, scanner, copier, or multifunctional apparatus capable of performing a plurality of image forming functions. In such case, the server 1 may be provided with any desired type of device driver, which controls image forming operation of the image forming apparatus 3.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an information processing apparatus including: means for creating a directory structure in a storage area referred by an operating system, the directory structure including a printer driver directory and a logical printer directory classified in layers; means for storing print settings information controlled by a printer driver in the logical printer directory of the directory structure; and means for storing a directory name assigned to the logical printer directory in a storage area provided by the operating system for a logical printer.

In the above-described example, the information processing apparatus further includes: means for generating a user directory for a login user of the operating system under the logical printer directory and storing the print settings information controlled by the printer driver in the user directory.

In the above-described example, the information processing apparatus further includes: means for generating a group directory under the logical printer directory, wherein the group directory groups the user directory by a previously set group.

In the above-described example, the information processing apparatus further includes: means for generating a specific character string that is unique in the printer driver directory, the specific character string being used as the directory name of the logical printer directory.

In the above-described example, the information processing apparatus further includes: means for replacing a character of the directory name of the logical printer directory which is not permitted for use by a file system of the operating system with a character permitted for use by the file system of the operating system.

In another example, the present invention may reside in: a recording medium storing a plurality of instructions which cause a computer to perform a method including: creating a directory structure in a storage area referred by an operating system, the directory structure including a printer driver directory and a logical printer directory classified in layers; storing print settings information controlled by a printer driver in the logical printer directory of the directory structure; and storing a directory name assigned to the logical printer directory in a storage area provided by the operating system for a logical printer.

What is claimed is:

1. An information processing apparatus provided on a printing system, the apparatus comprising:
   a storage device; and
   a data storage manager configured to:
   create a printer driver data directory for a printer driver installed onto the printing system on the storage device;
   create a logical printer data directory for a logical printer being registered for the installed printer driver under the printer driver data directory so as to generate with the printer driver data directory a layered directory structure to be managed by an operating system of the printing system on the storage device;
   store print settings data generated for the registered logical printer in the logical printer data directory generated on the storage device; and
   store information regarding a directory name of the logical printer data directory in a storage area of the storage device, the storage area being provided by the operating system for the logical printer,
   wherein in response to a request by the operating system to delete the logical printer, the data storage manager is configured to:
   obtain a first directory path of the print settings from the operating system and a name of the printer driver,
   generate a second directory path based on the first directory path of the print settings and the name of the printer driver, and
   delete the print settings data for the logical printer being deleted based on the second directory path.

2. The apparatus of claim 1, wherein the data storage manager is further configured to:
   create a user data directory for a user logged onto the printing system under the logical printer data directory on the storage device; and
   store print settings data generated for the user in the user data directory generated on the storage device.

3. The apparatus of claim 2, wherein the data storage manager is further configured to:
   obtain group definition file data used for classifying a plurality of users of the printing system by group;
   create a group data directory for a group to which the user belongs under the logical printer data directory on the storage device; and
   store the user data directory in which the print settings data generated for the user is stored, in the group data directory created for the group on the storage device.

4. The apparatus of claim 1, wherein the data storage manager is configured to:
   generate a character string;
   determine whether the character string is used for any directory generated under the printer driver data directory to generate a determination result; and
   specify the directory name of the logical printer data directory using the character string based on the determination result indicating that the character string is not used for any directory generated under the printer driver data directory.

5. The apparatus of claim 4, wherein the data storage manager is configured to:
   determine whether the character string includes a character not permitted for use by a file system of the operating system; and
   replace the character not permitted for use with a character permitted for use by the file system of the operating system.

6. A method of managing print settings data for a printing system, the method comprising:
   creating a printer driver data directory for a printer driver installed onto the printing system;
   creating a logical printer data directory for a logical printer being registered for the installed printer driver under the printer driver data directory so as to generate with the printer driver data directory a layered directory structure to be managed by an operating system of the printing system;
   storing print settings data generated for the registered logical printer in the logical printer data directory; and
   storing information regarding a directory name of the logical printer data directory in a storage area provided by the operating system for the logical printer,
   wherein when receiving a request by the operating system to delete the logical printer, the method further includes:
   obtaining a first directory path of the print settings from the operating system and a name of the printer driver,
   generating a second directory path based on the first directory path of the print settings and the name of the printer driver, and
   deleting the print settings data for the logical printer being deleted based on the second directory path.

7. The method of claim 6, further comprising:
   creating a user data directory for a user logged onto the printing system under the logical printer data directory; and
   storing print settings data generated for the user in the user data directory.

8. The method of claim 7, further comprising:
   obtaining group definition file data used for classifying a plurality of users of the printing system by group;
   creating a group data directory for a group to which the user belongs under the logical printer data directory; and
   storing the user data directory in which the print settings data generated for the user is stored, in the group data directory created for the group.

9. The method of claim 6, further comprising:
   generating a character string;
   determining whether the character string is used for any directory generated under the printer driver data directory to generate a determination result; and
   specifying the directory name of the logical printer data directory using the character string based on the determination result indicating that the character string is not used for any directory generated under the printer driver data directory.

10. The method of claim 9, further comprising:
    determining whether the character string includes a character not permitted for use by a file system of the operating system; and
    replacing the character not permitted for use with a character permitted for use by the file system of the operating system.

11. A non-transitory recording medium storing a plurality of instructions which cause a computer to perform a method of managing print settings data for a printing system, the method comprising:
    creating a printer driver data directory for a printer driver installed onto the printing system;
    creating a logical printer data directory for a logical printer being registered for the installed printer driver under the printer driver data directory so as to generate with the printer driver data directory a layered directory structure to be managed by an operating system of the printing system;

storing print settings data generated for the registered logical printer in the logical printer data directory; and storing information regarding a directory name of the logical printer data directory in a storage area provided by the operating system for the logical printer, wherein when receiving a request by the operating system to delete the logical printer, the method further includes:
obtaining a first directory path of the print settings from the operating system and a name of the printer driver,
generating a second directory path based on the first directory path of the print settings and the name of the printer driver, and
deleting the print settings data for the logical printer being deleted based on the second directory path.

* * * * *